May 31, 1932.  E. L. CARMICHAEL  1,861,208
CHECK PROTECTOR
Filed May 19, 1930
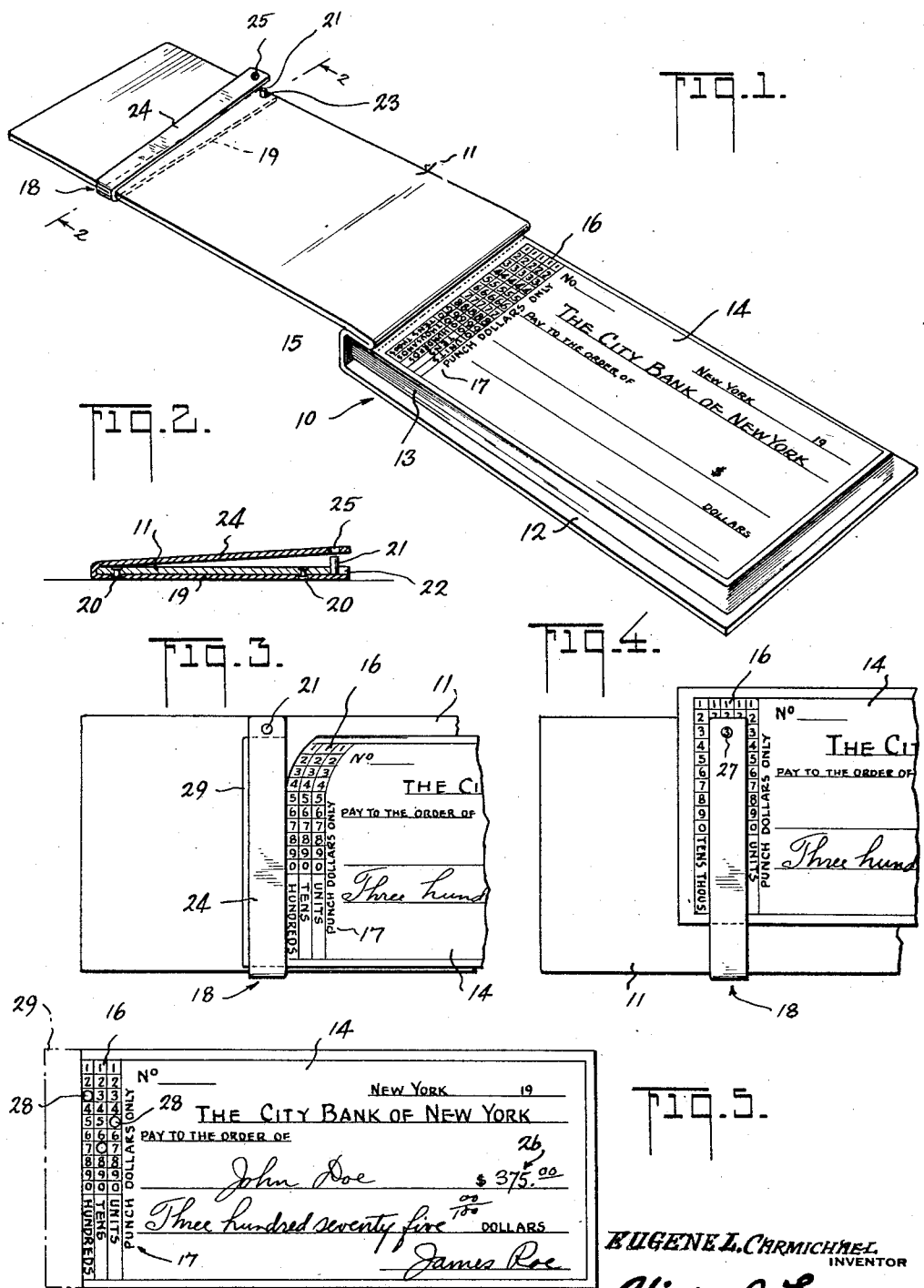

Patented May 31, 1932

1,861,208

UNITED STATES PATENT OFFICE

EUGENE L. CARMICHAEL, OF NEW YORK, N. Y., ASSIGNOR OF ONE-HALF TO EDWARD I. GERSH, OF NEW YORK, N. Y.

CHECK PROTECTOR

Application filed May 19, 1930. Serial No. 453,757.

This invention relates to check protectors and more particularly to a device of this character adapted to be provided as an adjunct to conventional types of check-books, in which the checks are provided with columns of digits which are utilizable in combination with the check protecting instrument whereby the face amount of the check or other negotiable instrument is positively indicated on the check, thus rendering it impossible for the amount to be improperly raised beyond the amount for which the check or the like was originally drawn.

The primary object of the invention is to provide a simple and convenient check-book attachment for use in combination with checks having columns of digits, the check protecting implement being adapted to perform the dual function of tearing off columns of digits not represented in the total amount for which the check or the like has been drawn, as well as means to punch out figures indicating the number of dollars represented in the face amount of the check.

Still another object of the invention is to provide a handy and convenient check protector combining a punch and tearing off device, which may be readily attached to conventional types of check-books.

Still another object is to simplify and improve the cost of check protectors generally and reduce the cost of manufacture thereof, so that the check protector may be economically manufactured, and, desirably, distributed by banks for the use of customers, for the protection of the bank and its customers.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show an embodiment of the invention as at present preferred.

In said drawings:

Fig. 1 is a perspective view of a check-book showing the present protector in operative position applied to the cover of the check-book;

Fig. 2 is a transverse sectional view substantially on the line 2—2 of Fig. 1, looking in the direction of the arrows;

Fig. 3 is a partial plan view showing the check protector in use, in the act of tearing off columns of digits which are not required to indicate the face amount of the check;

Fig. 4 is a view similar to Fig. 3 illustrating the check protector in the act of punching out figures representing the face amount for which the check has been drawn; and Fig. 5 is a plan view of a check which has been completed and protected by employment of the present check protector.

The check protector in this instance is shown applied to a substantially conventional type of check-book 10 including front and back covers 11 and 12 respectively. A pad 13 of checks 14 is bound to the back 15 of the cover 11 in any desired manner; or the back 15 may be constructed to clamp a pad of checks between the cover, as may be desired.

The checks 14 in this instance are provided with columns of digits 16 preferably reading from top to bottom and running from 1 to 9, followed by 0, each column being preferably designated "units", "tens", "hundreds", "thousands", "ten thousands", etc. Adjacent to the columns of figures I preferably apply legend 17 which instructs the user to punch figures representing dollars only.

Upon the cover 11, in this instance, I mount the combination punch and tearing off device 18. This combination punch and tearing off device 18 in this instance comprises a substantially U-shaped member having an outer portion 19 adapted to be secured to the cover of the check-book by suitable removable fastening devices 20. The free end of the outer portion 19 in this instance is provided with an upwardly extending punch 21 which preferably extends through a slot 22 which may be provided at the edge 23 of the check-book cover 11, so that the punch 21 projects above the inner surface of the cover 11. The punch and tearing off device 18 has an upper portion 24 in the form of a blade, this blade 24 being formed in one piece with the portion 19, the portions 19 and 24 being thus adapted to embrace the check-book cover 11. This blade 24 is provided with an aperture 25 in alignment with the punch 21. The punch and tearing off device is preferably constructed of spring metal, so that the blade 24 will normally return to a slightly elevated position after having been depressed during use of the punch 21.

In the use of the present equipment the check 14 is preferably filled out with its face amount 26 as seen in Fig. 5. The user then removes the check from the book and proceeds to punch out digits representing the number of dollars corresponding to the face amount of the check, as seen at 27 in Fig. 4, the holes 28, as seen in Fig. 5, thus indicating the highest number of dollars represented by the face amount of the check against any possibility of alteration.

In the illustration given it will be seen that the check has been drawn for $375.00. Thus the only columns employed will be only those representing hundreds, tens and units. The columns of figures above hundreds not being required, the same are removed by the use of the blade 24. The check is placed beneath the blade and the blade 24 is depressed to firmly secure the check, the edge of the blade being located at the end of the last column used. The check is then torn off to remove the superfluous columns of figures 29, as seen in Figs. 3 and 5. It will be seen that the tearing off device and punch is constructed of such size that the check may be readily inserted beneath the blade 24 and below the punch 21, so that no punching can occur while the check is being grasped by the tearing off blade.

It is understood that the present check protector is applicable to practically any conventional type of check book, as for instance one having a plurality of checks on a page.

The hereinbefore described construction admits of considerable modification without departing from the invention; therefore, it is the wish not to be limited to the precise arrangements shown and described, which are as aforesaid, by way of illustration merely. In other words the scope of protection contemplated is to be taken solely from the appended claims, interpreted as broadly as is consistent with the prior art.

What is claimed as new is:

1. A check protector comprising a combination punch and tearing off device including a substantially U-shaped member having an outer portion adapted to be secured to a check book cover, said punch and tearing off device including a punch, and a blade provided with an aperture for alignment with said punch, whereby to punch out a portion of a blank check, said blade including a straight-edge and being adapted to securely hold said blank check beneath said straight-edge while severing a portion of said check.

2. A check protector comprising a combination punch and tearing off device including a substantially U-shaped member having an outer portion adapted to be secured to a check book cover, the free end of one portion of said device having an upwardly extending punch, said combination punch and tearing off device having an integral blade, said blade having an aperture for alignment with said punch, whereby a portion of a blank may be punched out, said blade including a straight-edge and being adapted to securely hold the blank beneath said straight-edge while severing a portion of said blank from the remainder.

3. A check protector comprising a combination punch and tearing off device including a substantially U-shaped member having an outer portion adapted to be secured to a check book cover, the free end of said outer portion having an upwardly extending punch, said combination punch and tearing off device having an integral blade adapted to be disposed at the inner side of said cover, said blade having an aperture for alignment with said punch, whereby a portion of a blank may be punched out by depressing said blade, said blade including a straight-edge and being adapted to securely hold the blank beneath said straight-edge while severing a portion of said blank from the remainder.

In testimony whereof I affix my signature.

EUGENE L. CARMICHAEL.